United States Patent
Krebs et al.

(10) Patent No.: US 12,173,415 B2
(45) Date of Patent: Dec. 24, 2024

(54) METHOD FOR CHEMICALLY PICKLING A CAST METAL PART WITH POROUS CERAMIC CORE(S)

(71) Applicant: SAFRAN AIRCRAFT ENGINES, Paris (FR)

(72) Inventors: Jean Philippe Krebs, Moissy-Cramayel (FR); Aymeric Bruin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 72 days.

(21) Appl. No.: 17/906,410

(22) PCT Filed: Mar. 15, 2021

(86) PCT No.: PCT/FR2021/050425
§ 371 (c)(1),
(2) Date: Sep. 15, 2022

(87) PCT Pub. No.: WO2021/186124
PCT Pub. Date: Sep. 23, 2021

(65) Prior Publication Data
US 2023/0175141 A1    Jun. 8, 2023

(30) Foreign Application Priority Data
Mar. 18, 2020    (FR) .................... 2002672

(51) Int. Cl.
*C23G 1/08*    (2006.01)
*B22C 9/10*    (2006.01)
(Continued)

(52) U.S. Cl.
CPC ............. *C23G 1/02* (2013.01); *B22C 9/10* (2013.01); *F01D 5/187* (2013.01);
(Continued)

(58) Field of Classification Search
None
See application file for complete search history.

(56) References Cited

U.S. PATENT DOCUMENTS

| 4,873,014 A | * | 10/1989 | Long | .................. C23G 1/06 |
| | | | | 510/421 |
| 2018/0054527 A1 | * | 2/2018 | Zhao | .................. H04M 7/0075 |
| 2018/0094527 A1 | * | 4/2018 | Halfmann | ............... F01D 5/082 |

FOREIGN PATENT DOCUMENTS

| EP | 1637253 A1 | 3/2006 |
| FR | 3084673 A1 | 2/2020 |
| WO | 2019202281 A1 | 10/2019 |

OTHER PUBLICATIONS

International Search Report for issued in Application No. PCT/FR2021/050425 dated Jun. 23, 2021.

(Continued)

*Primary Examiner* — Eric W Golightly
(74) *Attorney, Agent, or Firm* — Pearne & Gordon LLP

(57) ABSTRACT

A method for chemically pickling a cast metal part, including a metal envelope which delimits an inner space in which at least one porous ceramic core is housed, and an outer space, the ceramic core being in fluid communication with the outer space, which method including: filling the pores of the ceramic core with a liquid; and then chemically pickling the cast metal part. This chemical pickling method may be implemented in a method for manufacturing a metal part by investment casting. This method is applicable at least to manufacture of turbine blades for turbomachines and, especially, for aircraft turbojet engines.

13 Claims, 2 Drawing Sheets

(51) Int. Cl.
   *C23G 1/02*       (2006.01)
   *F01D 5/18*       (2006.01)
(52) U.S. Cl.
   CPC .... *F05D 2220/323* (2013.01); *F05D 2230/10* (2013.01); *F05D 2230/211* (2013.01)

(56) References Cited

OTHER PUBLICATIONS

Written Opinion for PCT/FR2021/050425 dated Jun. 23, 2021.
Search Report issued in French Patent Application No. 2002672 dated Oct. 9, 2020.

* cited by examiner

METHOD FOR CHEMICALLY PICKLING A CAST METAL PART WITH POROUS CERAMIC CORE(S)

This is the National Stage of PCT international application PCT/FR2021/050425, filed on Mar. 15, 2021 entitled "METHOD FOR CHEMICAL PICKLING OF A CAST METAL PART WITH POROUS CERAMIC CORE(S)", which claims the priority of French Patent Application No. 2002672 filed Mar. 18, 2020, both of which are incorporated herein by reference in their entireties.

TECHNICAL FIELD

The invention pertains to the field of manufacturing metal parts by investment casting.

More specifically, it relates to a method for chemically pickling a cast metal part with porous ceramic core(s).

It also relates to a method for manufacturing a metal part by investment casting, in which this chemical pickling method is implemented.

The invention finds application, in particular, in the manufacture of turbine blades for turbomachines, which have inner cavities with a complex geometry, forming in particular cooling circuits, such as those fitted to aircraft turbojets.

PRIOR ART

To manufacture metal parts such as turbine blades for turbomachines, the casting technique known as "investment casting" is conventionally used.

Schematically, the manufacture of turbine blades by investment casting, which consist of a metal structure comprising one or more cavities separated from each other by walls, involves first of all making ceramic parts, known as "ceramic cores", which are to form the blade cavities.

For each of the blades desired to be manufactured, a wax model is made, for example by injecting a liquid wax under pressure into a metal mould internally having the outer shape of the blade and in which one or more ceramic cores have been placed depending on the number of cavities that the blade is supposed to have.

After demoulding the wax model thus obtained, the latter is covered with a shell, also called "shell mould", of a refractory material, typically a ceramic, by successive dipping operations of the wax model in slurries followed by sand blasting called "stucco".

After solidification and drying, the shell mould is subjected to an operation called "dewaxing", which consists in discharging the wax model from the mould by melting this wax.

Then, the shell mould is sintered, thereby removing traces of wax present inside the shell mould, consolidating this mould and bringing it to the casting temperature of the metal or alloy.

After checking the internal and external integrity of the shell mould, a molten metal or metal alloy is poured into the shell mould and occupies spaces existing, following dewaxing, between the internal wall of the shell mould and the ceramic core(s) as well as between the ceramic cores themselves if several cores are present.

After solidification of the metal or alloy, the shell mould is destroyed, typically by vibration or by water jetting, and then the ceramic core(s) are removed, typically by dissolution in an adapted basic solution (KOH or NaOH). These operations are called "shake-out".

The shake-out operations are followed by various finishing operations and then by inspection to check that the turbine blades are compliant.

Thus, in the investment casting method, the metal structure of the blades is formed by the spaces into which the metal or alloy has been cast, while the blade cavities are formed by the spaces left empty by shaking out the ceramic cores.

Within the scope of manufacturing some blades, between shaking out the shell moulds and shaking out the ceramic cores, the outer surface of the metal structure of the blades, which has been left exposed by shaking out the shell moulds, is chemically pickled.

This pickling, which aims at suppressing residual surface stresses, is typically carried out by immersing the blades in a hydrochloric acid-based bath.

Since the ceramic cores are in fluid communication with the acid bath and have a porous structure, they become saturated with and retain acid during chemical pickling.

Given that shaking out the ceramic cores is not necessarily carried out at the same time as the pickling, the retention of acid by the ceramic cores may result in more or less significant lacks of material at the metal structure of the blades, especially in the inner surface of what is commonly known as the "bathtub" in the field of blades, as well as in the walls separating the inner cavities housed in this structure.

Below a certain depth, the lacks of material does not justify scrapping the blades for non-compliance with the specifications of the definition, but it can affect longevity of the blades, whereas above this depth, the blades are quite simply scrapped.

DISCLOSURE OF THE INVENTION

The invention just aims to provide a simple and economical solution to this problem by providing a method for chemically pickling a cast metal part, comprising a metal envelope which delimits an inner space in which at least one porous ceramic core is housed, and an outer space, the ceramic core being in fluid communication with the outer space, which method comprises:

filling the pores of the ceramic core with a liquid; then
chemically pickling the cast metal part.

Thus, according to the invention, the pores of the ceramic core(s) are filled with a liquid before conducting chemical pickling of the cast metal part so as to prevent or, at least, limit penetration of the bath used for chemical pickling into these pores.

In the foregoing and the following, the term "metal envelope" is understood to mean an envelope made of a metal alloy as well as a metal.

In accordance with the invention, filling the pores of the ceramic core(s) is preferably carried out by immersing the metal part in the liquid, preferably at room temperature.

However, it can also be carried out by injecting the liquid into the metal part through the opening(s) included in the metal envelope of the cast metal part.

Preferably, filling the pores of the ceramic core(s) is carried out until the mass of liquid present in these pores represents at least 90%, preferably 95% and, ideally, 100% of the mass of liquid that these pores would contain if they were saturated with liquid.

The filling time required to obtain such a mass of liquid in the pores of the porous core(s) can easily be determined, for a cast metal part of a given type, by weighing this metal part during this filling—it being understood that at saturation or quasi-saturation, the weight of the metal part will remain constant or quasi-constant—and then be applied to all cast metal parts of the same type.

The choice of the liquid is not particularly limited as long as its viscosity allows it to easily penetrate the pores of the ceramic core.

However, it is preferred to use an aqueous solution—which may, for example, be a dilute solution of an alkali such as soda or potash if the chemical pickling is to be acidic—and, preferably, water.

Depending on the metal or alloy of which the metal envelope of the cast metal part is made, the chemical pickling can be:
- an acid pickling, which is carried out, for example, by immersing the cast metal part in a bath comprising a mineral acid or a mixture of mineral acids of the hydrochloric acid, sulphuric acid, hydrofluoric acid, nitric acid, phosphoric acid type, etc., or by spraying such a bath onto the metal part; or
- an alkaline pickling, which is carried out, for example by immersing the cast metal part in a bath containing an alkali of the soda or potash type, or by spraying such a bath onto the metal part; or even
- a pickling which combines two successive treatments of the cast metal part, one by a bath comprising a mineral acid or a mixture of mineral acids and the other by a bath comprising an alkali.

In all cases, the pickling can be carried out while hot.

In accordance with the invention, the chemical pickling is preferably an acid pickling.

More specifically, this pickling advantageously comprises immersing the cast metal part in a bath comprising hydrochloric acid.

In accordance with the invention, the cast metal part is preferably a turbine blade for a turbomachine and, even more preferably, a turbine blade for an aircraft turbojet engine.

The invention also relates to a method of manufacturing a metal part by investment casting, comprising:
- providing a cast metal part, comprising a metal envelope which delimits an inner space in which at least one porous ceramic core is housed, and an outer space, the porous ceramic core being in fluid communication with the outer space; and
- chemically pickling the cast metal part by carrying out a chemical pickling method as previously described.

In accordance with the invention, the metal part is preferably a turbine blade for a turbomachine and, still better, a turbine blade for an aircraft turbojet engine.

Further advantages and characteristics of the invention will become apparent upon reading the following additional non-limiting description, which refers to the appended figures.

DETAILED DESCRIPTION OF ONE PARTICULAR IMPLEMENTATION

Figure 1:
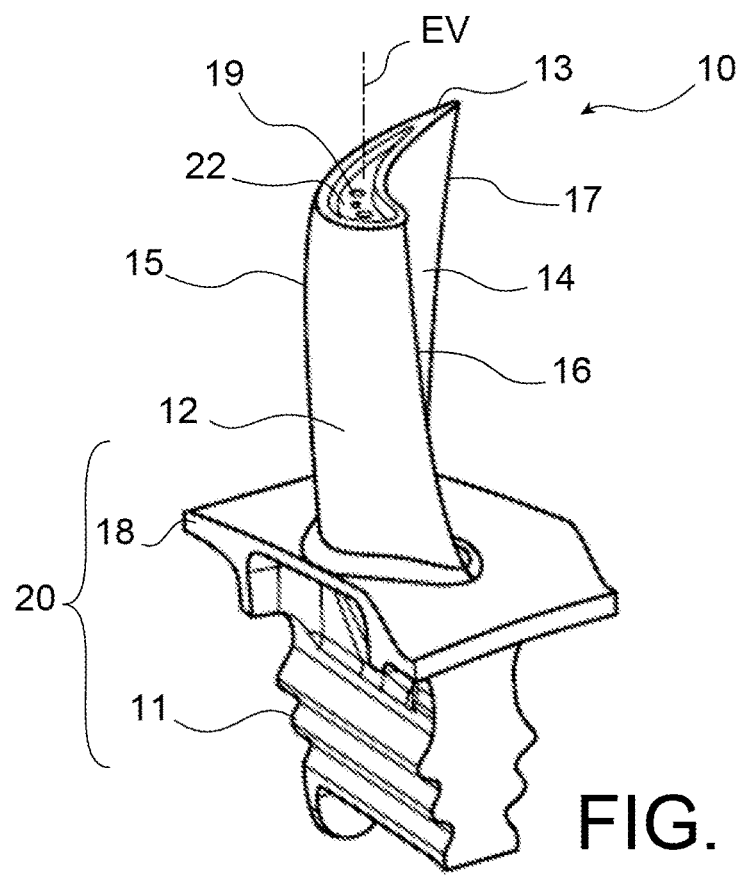
FIG. 1 illustrates, in a perspective view, one example of a turbine blade for a turbomachine likely to be manufactured by investment casting.

Reference is first made to FIG. 1 which illustrates an example of a turbine blade 10 for a turbomachine which can be manufactured by an investment casting method.

Such a blade comprises a metal structure 20 comprised of three elements, namely:
- a root 11 by which it is to be attached to a turbine disc (not represented),
- an airfoil 12 delimited by a shell 13 which twists about an axis EV known as the "span axis", forming a lower surface 14 and an upper surface 15 connected into a leading edge 16 and a trailing edge 17, and
- an intermediate region 18, called the platform, which extends approximately perpendicular to the axis EV and connects the root 11 to the airfoil 12.

The metal structure 20 is a one-piece part, which includes an inner cavity used, in operation, to cool the blade by conveying fresh air through this blade. This inner cavity extends, for example, from a mouth formed at the base of the root (and therefore not visible in FIG. 1) to the holes 19, known as "dust removal holes", that a wall 22 located at the top of the blade includes. This wall forms the bottom of an open cavity commonly known as a "bathtub".

If the blade is made by investment casting, then the bathtub and the inner cavity of the blade are, for example, obtained by using a ceramic core in two parts: a first part forming the negative of the bathtub and a second part forming the negative of the inner cavity of the blade, these two parts being connected by ceramic bridges forming the negative of the holes 19, while the metal structure 20 of the blade is obtained by casting a molten metal or metallic alloy between the ceramic core and a shell mould of a refractory material, typically a ceramic, after dewaxing and sintering this mould.

After solidification of the metal or alloy, the shell mould is shaken out.

Figure 2:
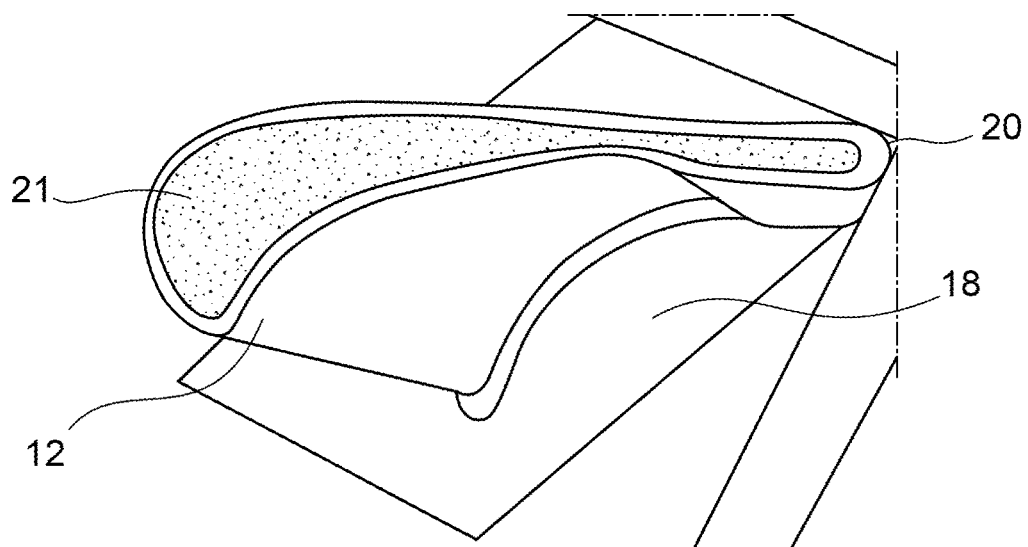
FIG. 2 illustrates, in a top view, the turbine blade of FIG. 1 as manufactured by investment casting, after the shell mould used in its manufacture has been shaken out but before the porous ceramic core used in its manufacture has been shaken out.

The blade illustrated in FIG. 2 is thus obtained, in a top view at the airfoil 12.

As is visible in this figure, the outer surface of the metal structure 20 of the blade 10 has been left exposed by the destruction—or shake-out—of the shell mould, but the ceramic core—of which the part, referenced 21, forming the negative of the bathtub is seen—is still present.

If the outer surface of the metal structure 20 of the blade is subjected to a chemical pickling by immersing this blade in a highly concentrated acid bath, the first and second parts of the ceramic core will be saturated with acid by capillarity, since this core has a porous structure, and will retain the acid as long as the ceramic core is itself not shaken out.

As a result, after the ceramic core has been shaken out, lacks of material can be observed at the inner surface of the metal structure 20, especially at the inner surface of the wall 22.

In order to prevent the occurrence of this incomplete die filling, it is therefore proposed according to the invention filling the pores of the ceramic core with a liquid, for example by immersing the blade in this liquid, preferably until these pores are saturated with liquid, before conducting the chemical pickling.

The liquid is preferably water.

Figure 3:
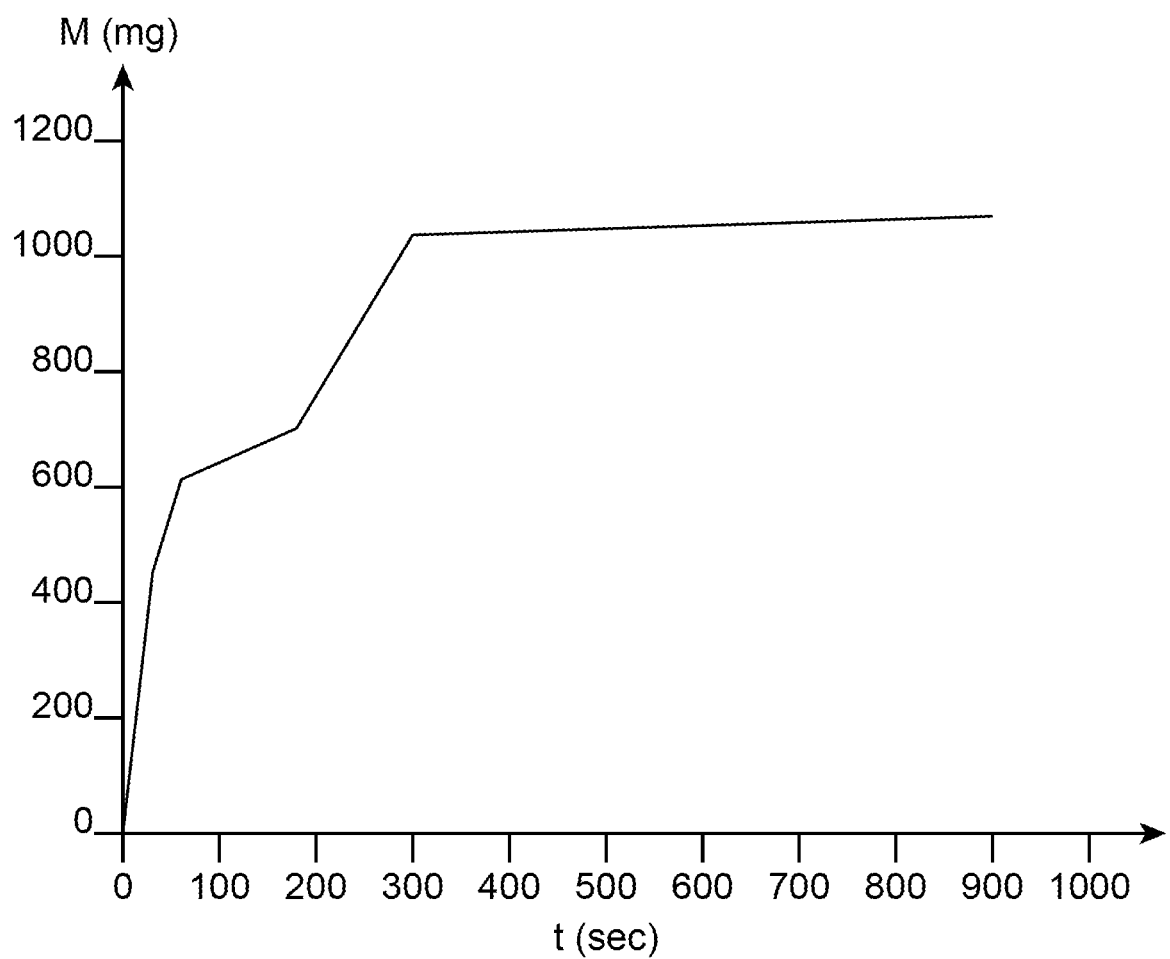
FIG. 3 illustrates the course of the mass of water, noted M and expressed in mg, absorbed by the porous ceramic core of a turbine blade of the type shown in FIG. 2 as a function of the immersion time, noted t and expressed in seconds, of this blade in water.

As illustrated in FIG. 3, which represents the course of the mass of water, noted M and expressed in mg, absorbed by the porous ceramic core of a blade as shown in FIG. 2 as a function of the immersion time, noted t and expressed in seconds, of this blade in water, an immersion time of 5 minutes is sufficient to obtain a quasi-saturation of the ceramic core with water.

What is claimed is:

1. A method for manufacturing a metal part by investment casting the method, comprising:
   providing a cast metal part comprising a metal envelope which defines an inner space in which at least one porous ceramic core is housed, and an outer space, the at least one porous ceramic core being in fluid communication with the outer space, the step of providing comprising casting a molten metal or metal alloy into a shell mould containing the at least one porous ceramic core, solidifying the metal or metal alloy, and destroying the shell mould; and then
   chemically pickling the cast metal part, the chemical pickling comprising:
      filling the pores of the at least one porous ceramic core with a first liquid which does not pickle the cast metal part; and then
      chemically pickling the cast metal part with a second liquid which pickles the cast metal part, wherein the first liquid is different from the second liquid.

2. The method of claim 1, wherein filling the pores comprises immersing the cast metal part in the first liquid.

3. The method of claim 1, wherein the pores are filled with a mass of the first liquid representing at least 90% of a mass of the first liquid that the pores would contain if they were saturated with the first liquid.

4. The method of claim 3, wherein the pores are filled with a mass of the first liquid representing at least 95% of the mass of the first liquid that the pores would contain if they were saturated with the first liquid.

5. The method of claim 1, wherein the first liquid is an aqueous solution.

6. The method of claim 1, wherein the chemical pickling with the second liquid is an acid pickling.

7. The method of claim 6, wherein the acid pickling comprises immersing the cast metal part in a bath comprising hydrochloric acid.

8. The method of claim 1, wherein the cast metal part is a turbine blade for a turbomachine.

9. The method of claim 3, wherein the pores are filled with a mass of the first liquid representing 100% of the mass of the first liquid that the pores would contain if they were saturated with the first liquid.

10. The method of claim 5, wherein the first liquid is water.

11. The method of claim 8, wherein the turbine blade is for an aircraft turbojet engine.

12. The method of claim 1, wherein the shell mould is destroyed by vibrations.

13. The method of claim 1, wherein the shell mould is destroyed by water jetting.

* * * * *